United States Patent [19]
Lawson

[11] Patent Number: 6,078,475
[45] Date of Patent: *Jun. 20, 2000

[54] LOW FRICTION PIVOT FOR ROTARY ACTUATOR IN DISK DRIVE

[75] Inventor: Drew Brent Lawson, Los Gatos, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/946,723

[22] Filed: Oct. 8, 1997

[51] Int. Cl.$^7$ ............................................. G11B 5/55
[52] U.S. Cl. .............................................. 360/106
[58] Field of Search ........................... 360/104, 105, 360/106, 107

[56] References Cited

U.S. PATENT DOCUMENTS

| | | | |
|---|---|---|---|
| 3,770,906 | 11/1973 | Andoh | 360/104 |
| 4,151,573 | 4/1979 | Tandon et al. | 360/104 |
| 4,197,566 | 4/1980 | Suzuki et al. | 360/103 |
| 4,340,918 | 7/1982 | Jansen | 360/109 |
| 4,628,386 | 12/1986 | Chabrolle | 360/104 |
| 4,764,830 | 8/1988 | Kobayashi et al. | 360/104 |
| 4,905,107 | 2/1990 | Klein | 360/77.03 |
| 5,510,940 | 4/1996 | Tacklind et al. | 360/106 |
| 5,555,211 | 9/1996 | Bernett | 360/99.08 |
| 5,835,309 | 11/1998 | Boutaghou | 360/106 |

OTHER PUBLICATIONS

Floppy Disk Device, JA 0236158, Nov. 22, 1985 (Abstract).
T.A. Hickox, Head Mount, IBM Technical Disclosure Bulletin, vol. 18, No. 2, Jul. 1975, p. 541.

*Primary Examiner*—David Davis
*Attorney, Agent, or Firm*—Noreen A. Krall; Felsman, Bradley, Vaden, Gunter & Dillon, LLP

[57] ABSTRACT

The rotary actuator comprises a transducer head connected to an E-block, a base, and a rotating data-storage disk journalled to the base. In addition, the rotary actuator comprises a top plate having a first pivot bearing socket, a bottom plate having a second pivot bearing socket, and a pivot shaft. The first pivot bearing socket is placed oppositely facing the second pivot bearing socket defining an axis therebetween. The pivot shaft is mounted between the first pivot bearing socket and the second pivot bearing socket along the defined axis, wherein the pivot shaft is embedded within a pivot center of the E-block having an axis of rotation for incrementally rotationally positioning the transducer head at data locations defined on a surface of the rotating data-storage disk. The axis of rotation of the E-block being generally coaxial to the defined axis of both bearing sockets.

4 Claims, 4 Drawing Sheets

LOW FRICTION PIVOT FOR ROTARY ACTUATOR IN DISK DRIVE

BACKGROUND OF THE INVENTION

1. Technical Field

The present invention relates to disk drives in general, and in particular to a rotary actuator within disk drives. Still more particularly, the present invention relates to a low friction pivot for a rotary actuator within disk drives.

2. Description of the Prior Art

In the prior art, a rotary voice coil actuator within a disk drive typically employs an upper and a lower ball-bearing assemblies. Such assemblies manifest a frictional torque in accordance with the ball friction multiplied by a radius extending from the center of rotation of an actuator shaft to approximately the center of rotation of a nominal rotating ball of the bearing assembly. This type of rotary actuator design is relatively low cost and has experienced widespread usages.

However, when the storage density of disk drives becomes increasingly higher, the size of the actuator within these disk drives also needs to be smaller and smaller. As the actuator becomes smaller, the ratio of friction (both static and dynamic) to actuator inertia may increase to a point that it becomes very difficult for an actuator-head-positioning servo system to make small displacements that are required for single-track seeking and for following a data-storage track centerline. In addition, with the increase in track densities, it is tremendously difficult to provide a motion with ever decreasing magnitude to carry out small distance seeks and to maintain a desired head position over a track.

One of the many disadvantages of the ball bearing assembly design is that undesirable low frequency resonance incident to small motions of the ball bearings in actuators attributed to the distortions of the ball can cause high stiffness with very low damping. During small motions, the actuator ball responds to an applied force by deforming elastically. This driving force will be increased until the actuator ball starts to roll and motion is realized. Unfortunately, by the time the actuator ball is driven out of its stick/slip state and into rotary movement, excessive driving current has been applied, and the transducer head is significantly mispositioned with respect to the desired track position. Furthermore, any initial deformation of the actuator ball also results in high starting friction (or stiction). Consequently, it would be desirable to provide an improved pivot design for rotary actuators without utilizing ball bearings.

SUMMARY OF THE INVENTION

In view of the foregoing, it is therefore an object of the present invention to provide an improved disk drive.

It is another object of the present invention to provide an improved rotary actuator within a disk drive.

It is yet another object of the present invention to provide an improved rotary actuator having a low friction pivot.

In accordance with a preferred embodiment of the present invention, a rotary actuator within a disk drive includes a transducer head connected to an E-block, a base, and a rotating data-storage disk journalled to the base. In addition, the rotary actuator includes a top plate having a first pivot bearing socket, a bottom plate having a second pivot bearing socket, and a pivot shaft. The first pivot bearing socket is placed oppositely facing the second pivot bearing socket defining an axis therebetween. The pivot shaft is mounted between the first pivot bearing socket and the second pivot bearing socket along the defined axis, wherein the pivot shaft is embedded within a pivot center of the E-block having an axis of rotation for incrementally rotationally positioning the transducer head at data locations defined on a surface of the rotating data-storage disk. The axis of rotation of the E-block being generally coaxial to the defined axis of both bearing sockets.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any direct access storage device. As will be understood by those skilled in the art, the present invention is applicable for disk drives having a rotary actuator.

Figure 1:
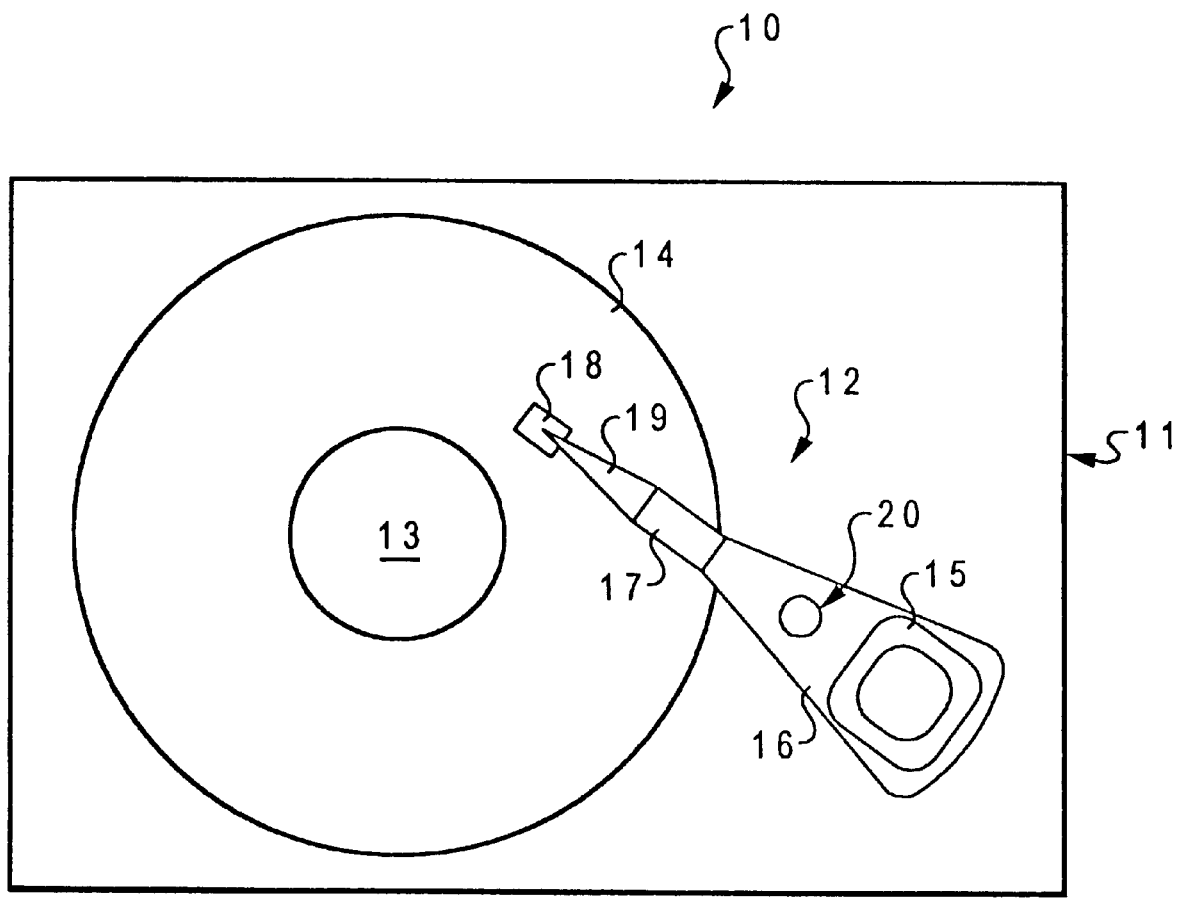
FIG. 1 is a diagram of a disk drive in which a preferred embodiment of the present invention may be incorporated.

Referring now to the drawings and in particular to FIG. 1, there is depicted a diagram of a disk drive 10 in which a preferred embodiment of the present invention may be incorporated. Disk drive 10 includes a suitable formed aluminum-alloy base 11, a rotating data-storage disk 14 mounted to a spindle 13 conventionally containing an in-hub spindle motor (not shown), and a rotary actuator assembly 12.

Actuator assembly 12 includes a flat voice coil 15 that moves within a high intensity magnetic gap formed by a fixed permanent magnet assembly (not shown) such that current applied in one direction of voice coil 15 causes clockwise movement of actuator assembly 12, and current applied in a reverse direction causes counter-clockwise movement thereof. Voice coil 15 is a part of a solid body block 16 within actuator assembly 12. Body block 16 is also referred to as an E-block. A head arm 17 extends from E-block 16 and supports a load beam 19 that preloads a transducer head 18 towards the storage surface of data-storage disk 14. A minute read/write head is located conventionally at one slider rail of transducer head 18 facing the storage surface of data-storage disk 14. Data-storage disk 14 may be made of, for example, very flat aluminum alloy, or glass substrate, sputter coated with a suitable thin film magnetic storage media. During operation, transducer head 18 "flies" on an air bearing formed at the surface of data-storage disk 14.

Figure 2:
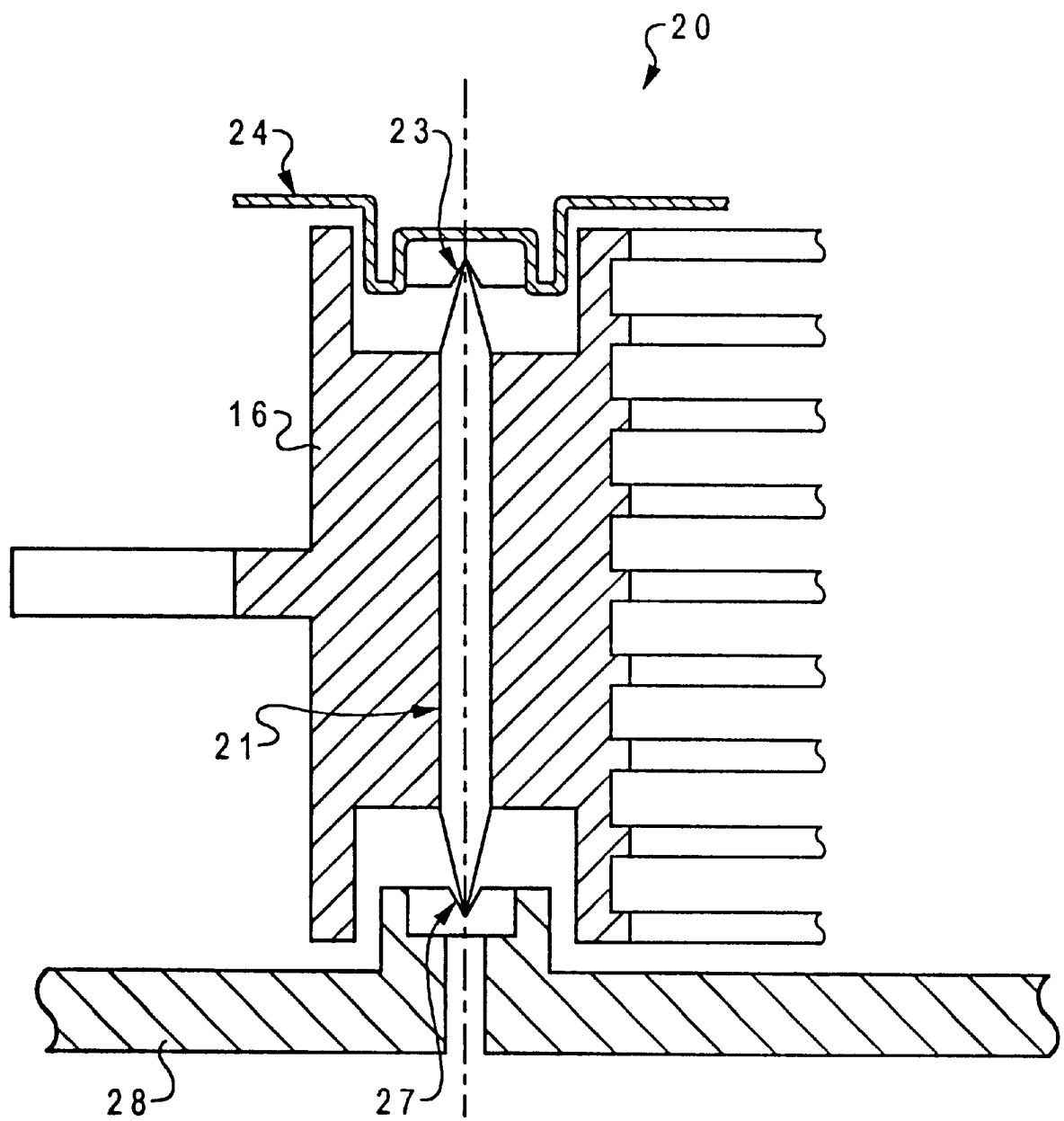
FIG. 2 is a cross-sectional diagram of an actuator pivot assembly in accordance with a preferred embodiment of the present invention.

The pivoting of actuator assembly 12 with respect to base 11 is provided for by an actuator pivot assembly 20. With reference now to FIG. 2, there is illustrated a cross-sectional diagram of actuator pivot assembly 20, in accordance with a preferred embodiment of the present invention. Actuator pivot assembly 20 includes a pivot shaft 21, a top plate 24, and a bottom plate 28. Pivot shaft 21 is embedded within the pivot center of E-block 16 of actuator assembly 12. With the cross-sectional diagram of E-block 16 as shown in FIG. 2, it is apparent that E-block 16 earned its name from the fact that its comb portion resembles the capital letter "E." Top plate 24 and bottom plate 28 are formed as a single integral sub-unit of E-block 16.

As a preferred embodiment of the invention, pivot shaft 21 has an upper end and a lower end. Each of these ends is generally conical in shape and has a spherical tip. Furthermore, top plate 24 provides a pivot bearing socket 23. Pivot bearing socket 23 is also conical in shape with a spherical tip. The size of pivot bearing socket 23 is slighter larger than the diameter of the upper end of pivot shaft 21, thereby forming a seat for the upper end of pivot shaft 21. Similarly, pivot bottom socket 27 is also conical in shape with a spherical tip. The size of pivot bearing socket 27 is slighter larger than the diameter of the lower end of pivot shaft 21, thereby also forming a seat for the lower end of pivot shaft 21. Pivot bearing socket 23 and pivot bearing socket 27 are substantially identical in size and shape. Bottom plate 28 is preferably formed as an integral part of base 11 for improved rigidity and alignment accuracy, but may optionally be formed as a discrete unit and subsequently attached to base 11.

Figure 3:
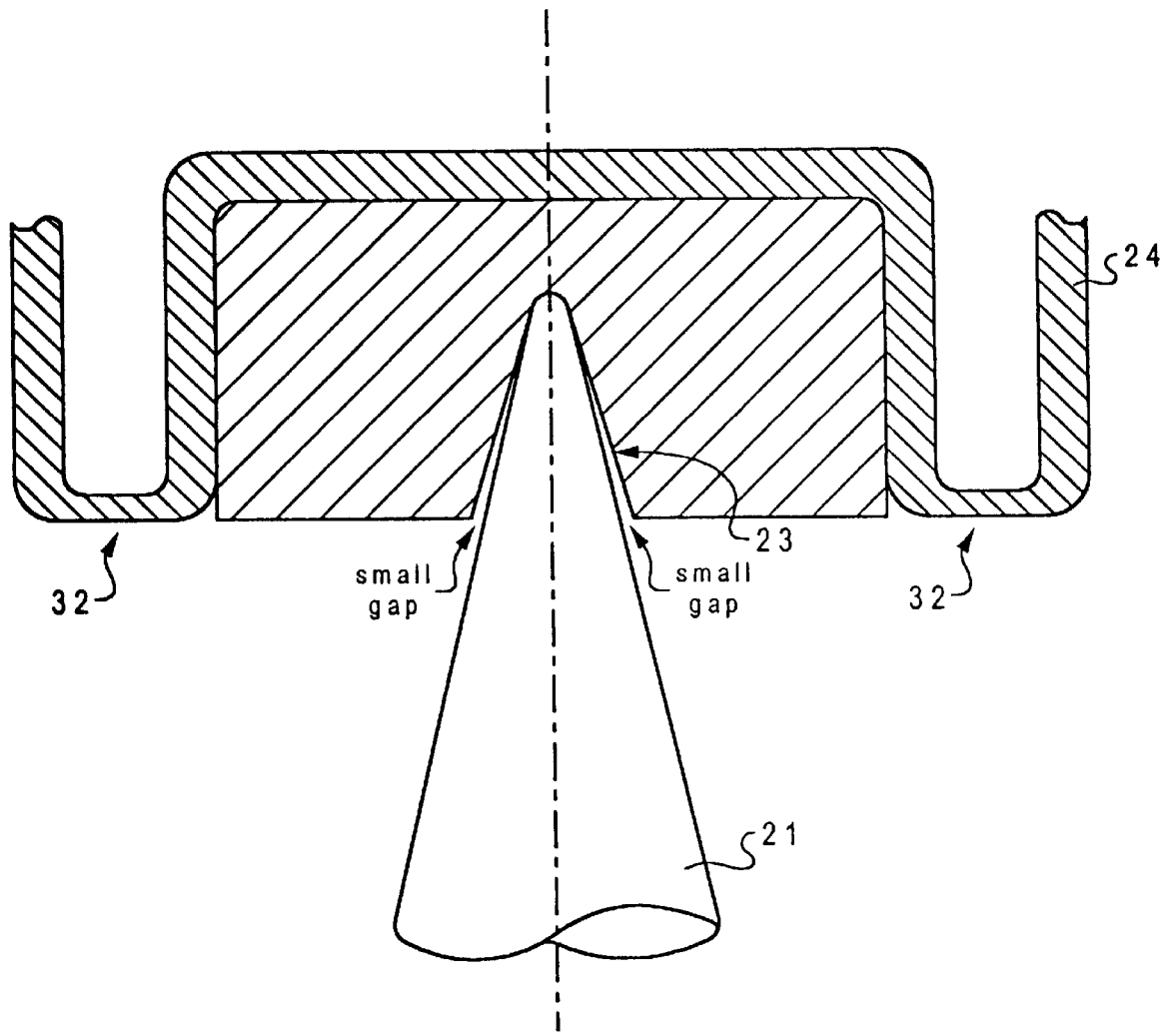
FIG. 3 is a detailed illustration of a first pivot bearing socket within the actuator pivot assembly of FIG. 2, in accordance with a preferred embodiment of the present invention.

Referring now to FIG. 3, there is depicted a detailed illustration of pivot bearing socket 23 within actuator pivot assembly 20, in accordance with a preferred embodiment of the present invention. As shown, pivot bearing socket 23 is attached to top plate 24 of actuator pivot assembly 20 for providing a seat for the upper end of pivot shaft 21. Pivot bearing socket 23 may be captivated within top plate 24 by either friction or adhesives. Both pivot bearing socket 23 and pivot shaft 21 are made of compatible materials that have low wear, low friction and adequate strength for fragility issues. As a preferred embodiment of the present invention, pivot bearing socket 23 is made of silicon carbide and pivot shaft 21 is made of 17-7 stainless steel with a hardened tip.

The shape of pivot bearing socket 23 is generally conical with a spherical tip and the size of pivot bearing socket 23 is slighter larger than the tip radius of the upper end of pivot shaft 21, which is also conical in shape. The tip radius of the upper end of pivot shaft 21 is sized such that a locus line extending from a center point of the tip to a center of rotation of pivot shaft 21 forms a desired angle with a main axis of rotation of actuator assembly 12. This particular angle will determine axial stiffness versus lateral stiffness of actuator assembly 12.

Furthermore, in order to retain pivot shaft 21 within pivot bearing socket 23 during impacts, actuator pivot assembly 20 has an axial preload that is greater than the shock-limit g load. Top plate 24 is designed with a compliance to provide the necessary axial preload. Thin area 32 in top plate 24 that allows compliance along the vertical axis can be accomplished with the proper material with heat treatment or a spring steel insert around pivot bearing socket 23.

Preferably, the radius of the spherical tip at the upper end of pivot shaft 21 is approximately 0.005 inches. The corresponding pivot bearing socket 23 has a slightly larger radius of 0.005005 inches. Both of these radii for both tip and socket are carefully selected to limit contact stress during a worst case shock impact of 125 g's (along the vertical axis). The required axial preload, coefficient of friction, and the radii of tip/socket define the friction torque; and the resultant friction torque is lower than that of the prior art ball bearing designs.

Figure 4:
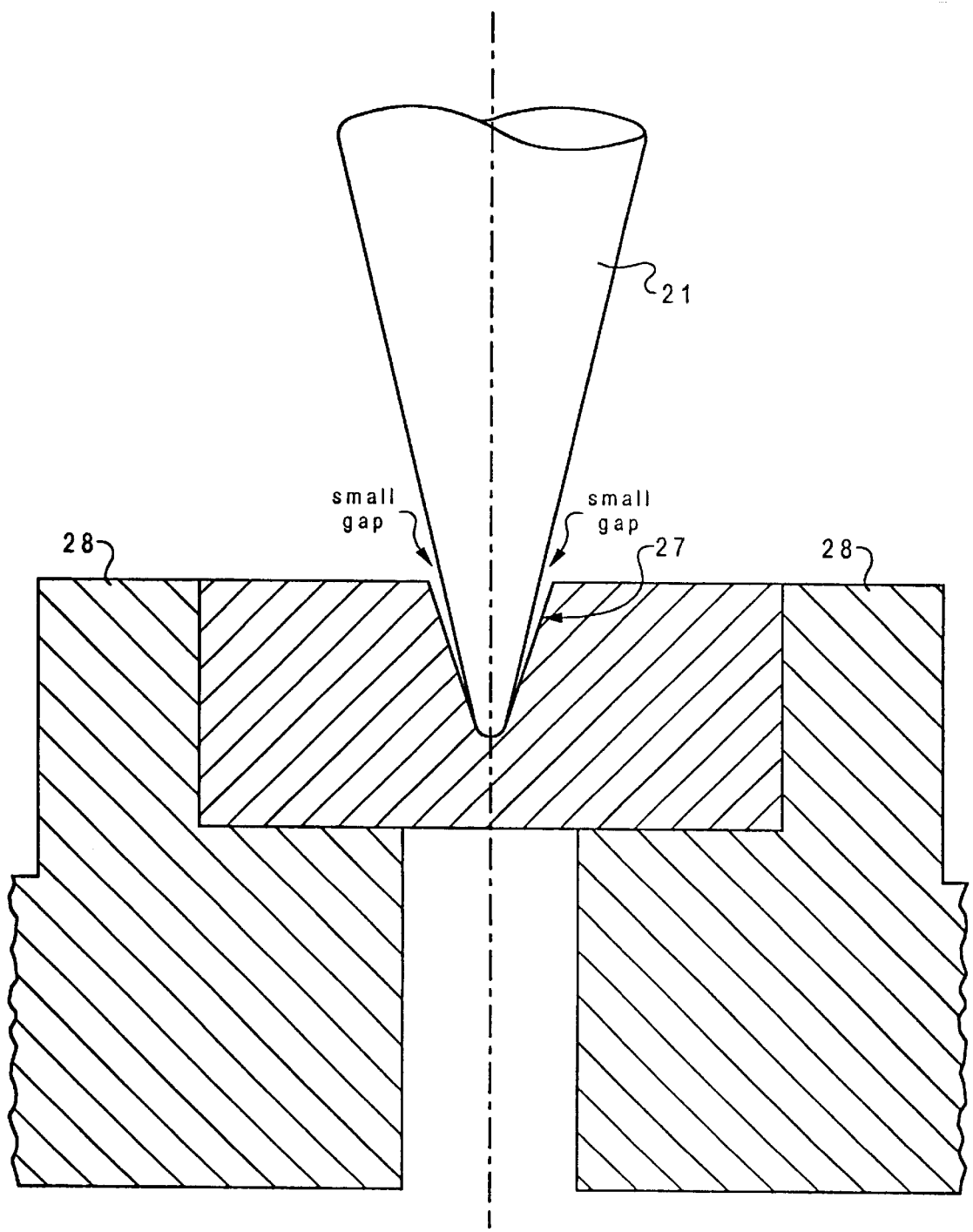
FIG. 4 is a detailed illustration of a second pivot bearing socket within the actuator pivot assembly of FIG. 2, in accordance with a preferred embodiment of the present invention.

With reference now to FIG. 4, there is depicted a detailed illustration of pivot bearing socket 27 within actuator pivot assembly 20, in accordance with a preferred embodiment of the present invention. As shown, pivot bearing socket 27 is attached to bottom plate 28 of actuator pivot assembly 20 for providing a seat for the lower end of pivot shaft 21. Pivot bearing socket 27 may be captivated within bottom plate 28 by either friction or adhesives. Pivot bearing socket 27 is made of materials compatible with pivot shaft 21, which is low wear, low friction, and strong enough for fragility issues. As a preferred embodiment of the present invention, pivot bearing socket 27 is made of silicon carbide.

The shape of pivot bearing socket 27 is generally conical with a spherical tip and the size of pivot bearing socket 27 is slighter larger than the tip radius of the lower end of pivot shaft 21, which is also conical in shape. The tip radius of the lower end of pivot shaft 21 is sized such that a locus line extending from a center point of the tip to a center of rotation of pivot shaft 21 forms a desired angle with a main axis of rotation of actuator assembly 12. This particular angle will also determine axial stiffness versus lateral stiffness of actuator assembly 12.

Preferably, the radius of the spherical tip at the lower end of pivot shaft 21 is approximately 0.005 inches. The corresponding pivot bearing socket 27 has a slightly larger radius of 0.005005 inches. Similar to the upper end of pivot shaft 21 described previously, both of these radii are carefully selected to limit contact stress during a worst case shock impact of 125 g's along the vertical axis.

As has been described, the present invention provides an improved rotary actuator to be utilized within a disk drive. This improved rotary actuator has a reduced friction pivot. With this reduced friction pivot, the rotary actuator will have less hysteresis and the associated servo system that controls the actuator movements will be more apt to cope with future disk drives having even higher track densities. Another advantage of eliminating the ball bearing assembly design under the prior art is that potential outgassing of the grease is eliminated.

While the invention has been particularly shown and described with reference to a preferred embodiment, it will be understood by those skilled in the art that various changes in form and detail may be made therein without departing from the spirit and scope of the invention.

What is claimed is:

1. A rotary actuator within a disk drive, wherein said disk drive includes a transducer head connected to an E-block, a base, and a rotating data-storage disk journalled to said base, said rotary actuator comprising:

a first pivot bearing fitted in a recess of a top plate of said rotary actuator, said first pivot bearing having a generally conical shape first pivot bearing socket with a first spherical tip;

a second pivot bearing fitted in a recess of a bottom plate of said rotary actuator, said second pivot bearing socket having a generally conical shape second pivot bearing socket with a second spherical tip, wherein said first pivot bearing socket and said second pivot bearing socket are substantially identical, wherein said second pivot bearing socket is placed oppositely facing said first pivot bearing socket defining an axis therebetween;

a pivot shaft mounted between said first pivot bearing socket and said second pivot bearing socket along said defined axis, said pivot shaft has a first end and a second end, said first end and said second end are generally conical in shape with a rounded tip, said first end and said second end of said pivot shaft are substantially identical, said pivot shaft is embedded within said first and second spherical tip and a pivot center of said E-block having an axis of rotation for incrementally rotationally positioning said transducer head at data locations defined on a surface of said rotating data-storage disk, said axis of rotation of said E-block being generally coaxial to said defined axis of said pivot bearing sockets.

2. The rotary actuator according to claim 1, wherein said either said first spherical tip or said second spherical tip has a radius of approximately 0.005005 inches.

3. A disk drive, comprising:

a base;

a rotating data-storage disk journalled to said base; and an actuator assembly having an E-block connected to a transducer head and a pivot assembly for pivoting said E-block with respect to said base, said pivot assembly further comprises:
 a first pivot bearing fitted in a recess of a top plate of said rotary actuator, said first pivot bearing socket having a generally conical shape first pivot bearing socket with a first spherical tip;
 a second pivot bearing fitted in a recess of a bottom plate of said rotary actuator, said second pivot bearing socket having a generally conical shape second pivot bearing socket with a second spherical tip, said first pivot bearing socket and said second pivot bearing socket are substantially identical, said second pivot bearing socket is placed oppositely facing said first pivot bearing socket defining an axis therebetween; and
 a pivot shaft mounted between said first pivot bearing socket and said second pivot bearing socket along said defined axis, said pivot shaft has a first end and a second end, said first end and said second end are generally conical in shape with a rounded tip, said first end and said second end of said Divot shaft are substantially identical, said pivot shaft is embedded within said first and second spherical tip and a pivot center of said E-block having an axis of rotation for incrementally rotationally positioning said transducer head at data locations defined on a surface of said rotating data-storage disk, said axis of rotation of said E-block being generally coaxial to said defined axis of said pivot bearing sockets.

4. The disk drive according to claim 3, wherein said either said first spherical tip or said second spherical tip has a radius of approximately 0.005005 inches.

* * * * *

UNITED STATES PATENT AND TRADEMARK OFFICE
CERTIFICATE OF CORRECTION

PATENT NO. : 6,078,475
DATED : June 20, 2000
INVENTOR(S) : Lawson

It is certified that error appears in the above-identified patent and that said Letters Patent is hereby corrected as shown below:

<u>Column 5,</u>
Line 15, please delete "said".

Signed and Sealed this

Ninth Day of October, 2001

*Attest:*

NICHOLAS P. GODICI
*Attesting Officer*    *Acting Director of the United States Patent and Trademark Office*